(12) United States Patent
Johnson et al.

(10) Patent No.: US 7,846,342 B2
(45) Date of Patent: Dec. 7, 2010

(54) HYDRAULIC FLUID DEHYDRATION SYSTEM AND METHOD INCLUDING PRE-HEATING

(75) Inventors: Charles N. Johnson, Racine, WI (US); Uwe E. Zimmermann, Racine, WI (US); Carsten Funk, Pfullingen (DE)

(73) Assignee: Putzmeister America, Inc., Sturtevant, WI (US)

( * ) Notice: Subject to any disclaimer, the term of this patent is extended or adjusted under 35 U.S.C. 154(b) by 180 days.

(21) Appl. No.: 12/014,979

(22) Filed: Jan. 16, 2008

(65) Prior Publication Data

US 2008/0173356 A1    Jul. 24, 2008

Related U.S. Application Data

(60) Provisional application No. 60/885,483, filed on Jan. 18, 2007.

(51) Int. Cl.
    *C02F 1/02* (2006.01)
(52) U.S. Cl. .................. 210/774; 210/799; 210/805; 210/130; 210/167.06; 210/175; 210/181; 184/6.24
(58) Field of Classification Search ............ 210/167.06, 210/181, 182, 195.2, 195.6, 651, 774, 799, 210/805, 806, DIG. 6, DIG. 7, 175, 416.5, 210/689; 184/6.24; 126/247
See application file for complete search history.

(56) References Cited

U.S. PATENT DOCUMENTS

| | | | |
|---|---|---|---|
| 3,954,611 A * | 5/1976 | Reedy | 210/695 |
| 4,060,194 A * | 11/1977 | Lutz | 237/1 SL |
| 4,344,567 A * | 8/1982 | Horne et al. | 237/1 R |
| 4,434,934 A | 3/1984 | Moser et al. | |
| 4,681,660 A * | 7/1987 | Budny | 196/46.1 |
| 4,728,029 A * | 3/1988 | Griebel et al. | 237/12.3 R |

(Continued)

FOREIGN PATENT DOCUMENTS

DE    3012760 A1    10/1981

(Continued)

OTHER PUBLICATIONS

PCT Search Report mailed Jan. 20, 2009.

*Primary Examiner*—Duane Smith
*Assistant Examiner*—Paul J Durand
(74) *Attorney, Agent, or Firm*—Andrus, Sceales, Starke & Sawall, LLP

(57) ABSTRACT

A mobile dehydration system that is operable to remove water from a supply of fluid, such as hydraulic fluid. The mobile dehydration system includes a fluid pump that draws the supply of hydraulic fluid from a storage tank. The flow of hydraulic fluid passes through a fluid heater that elevates the temperature of the hydraulic fluid. The fluid heater includes at least one flow restricting orifice that reduces the pressure of the flow of hydraulic fluid, thereby elevating the temperature of the hydraulic fluid. The outlet of the fluid heater is connected to a dehydrator that removes water from the flow of hydraulic fluid. A fluid feedback line is connected between the outlet of the fluid heater and the inlet of the fluid pump to return a portion of the hydraulic fluid flow when the flow rate through the dehydrator is less than the flow rate from the fluid pump.

19 Claims, 3 Drawing Sheets

U.S. PATENT DOCUMENTS

| | | |
|---|---|---|
| 4,768,347 A | 9/1988 | Manz et al. |
| 5,242,605 A * | 9/1993 | Romeo et al. ............... 210/774 |
| 6,207,051 B1 * | 3/2001 | Anderson et al. ........... 210/237 |
| 6,471,869 B1 | 10/2002 | Yanou et al. |
| 6,478,953 B2 | 11/2002 | Spearman et al. |
| 6,517,725 B2 | 2/2003 | Spearman et al. |
| 7,523,873 B1 * | 4/2009 | Lopes ................... 237/12.3 B |
| 2002/0063087 A1 | 5/2002 | Spearman et al. |

FOREIGN PATENT DOCUMENTS

WO             0112304 A1      2/2001

* cited by examiner

HYDRAULIC FLUID DEHYDRATION SYSTEM AND METHOD INCLUDING PRE-HEATING

CROSS REFERENCE TO RELATED APPLICATION(S)

The present application is based on and claims priority to U.S. Provisional Patent Application Ser. No. 60/885,483, filed Jan. 18, 2007.

BACKGROUND OF THE INVENTION

The present invention generally relates to a system and method for removing water from a hydraulic fluid or oil. More specifically, the present invention relates to a system and method that receives a supply of hydraulic fluid and elevates the temperature of the hydraulic fluid above ambient to enhance the effectiveness of a dehydrator.

During the operation of machinery powered by pressurized hydraulic fluid, such as oil, water can mix with the hydraulic fluid from ambient humidity, seal leaks, condensation or other sources near the work equipment. It is widely recognized that the presence of water within the hydraulic fluid has a negative impact on the life of the oil, as well as components within the system. It is well known that corrosion, oil oxidization, chemical wear and tear, reduced bearing fatigue life and the loss of lubricity may result when water contamination enters a hydraulic system. These negative effects can be directly attributed to water present in free, emulsified or dissolved form.

Consequently, significant efforts have been made to remove water from oil in order to provide optimal performance of hydraulic systems. Presently available systems that remove water from hydraulic fluid oftentimes utilize a porous media dehydrator, such as that shown in U.S. Pat. No. 6,517,725. This type of porous media dehydrator is sold by Porous Media under the product name UltiDri.

Although porous media dehydrators are well known, the porous media dehydrators suffer from several drawbacks due to the inherent characteristics of the dehydrator. Specifically, porous media dehydrators include a series of small tubes formed from a porous film that allow water to be removed from the hydraulic fluid passing through the dehydrator. Since the diameter of the tubes is small and defined, the amount of fluid that can flow through the dehydrator is directly related to the viscosity of the hydraulic fluid. Thus, the rate of water removal from the hydraulic fluid is dependent upon the flow rate of the fluid through the dehydrator, which in turn is dependent upon the viscosity of the hydraulic fluid.

SUMMARY OF THE INVENTION

The present invention generally relates to a system and method for dehydrating a supply of hydraulic fluid. The system and method utilizes a fluid heater positioned to heat the supply of hydraulic fluid prior to the hydraulic fluid passing through a fluid dehydrator that removes water from the hydraulic fluid. The system is a self-contained mobile dehydration system that can be used to remove water from a supply of hydraulic fluid.

The mobile dehydration system includes a cart that allows the entire mobile dehydration system to be self-contained and movable to a desired location to connect to the supply of hydraulic fluid to be dehydrated. Preferably, the cart includes an outer frame and a pair of cart wheels that allows the entire dehydration system to be easily movable.

The dehydration system includes an inlet hose that can be connected to an outlet of the supply of hydraulic fluid to be dehydrated. The inlet hose includes a standard connector that allows the inlet hose to be quickly and easily connected to the supply of hydraulic fluid.

The inlet hose is connected at one end to a fluid pump contained on the movable cart. The fluid pump is operable to draw a flow of hydraulic fluid from the storage tank at a determined flow rate. In one embodiment, the fluid pump is driven by an electric drive motor, although other types of drive motors are contemplated as being within the scope of the present disclosure.

The outlet of the fluid pump delivers a flow of hydraulic fluid to a fluid heater. The fluid heater includes an inlet that receives the flow of hydraulic fluid from the fluid pump. The fluid heater is operable to increase the temperature of the hydraulic fluid as the fluid passes through the heater.

In one embodiment of the disclosure, the fluid heater includes at least one flow orifice that has an internal diameter less than the internal diameter of the outlet of the fluid pump. The reduced diameter flow orifice restricts the flow of the fluid, which decreases the pressure across the orifice. The decrease in pressure across the flow orifice results in heating of the hydraulic fluid. In a preferred embodiment of the disclosure, the fluid heater includes a pair of flow orifices that each include a reduced internal diameter to decrease the pressure across the orifice, thus heating the flow of hydraulic fluid. Although one or more flow orifices are described as heating the flow of hydraulic fluid, various other types of heating devices could be utilized while operating within the scope of the present disclosure.

The heated hydraulic fluid flow leaving the fluid heater is received at an inlet to a filter that removes particles and other undesirable elements from the hydraulic fluid. Typically, the fluid filter includes very little resistance which allows the hydraulic fluid flow to pass through the filter without an appreciable drop in pressure. In this manner, the fluid filter operates to remove particles from the hydraulic fluid without decreasing the pressure of fluid across the filter.

The outlet of the fluid filter is connected to a dehydrator. Preferably, the dehydrator includes a series of porous tubes that receive the hydraulic fluid flow and allow the hydraulic fluid to pass from a dehydrator inlet to a dehydrator outlet. As the hydraulic fluid passes through the dehydrator, a supply of compressed air flows over the series of internal tubes to remove water from the hydraulic fluid. Since the dehydrator includes a series of porous tubes that receive the flow of hydraulic fluid, the flow rate through the dehydrator is dependent upon the viscosity of the hydraulic fluid. The physical properties of typical hydraulic fluid dictates that as the temperature of the hydraulic fluid increases, the viscosity decreases, thereby allowing for a greater flow rate of hydraulic fluid through the dehydrator. However, at relatively low temperatures of the hydraulic fluid, the flow rate through the dehydrator is significantly less than the flow rate of hydraulic fluid from the fluid pump.

To address the differences between the flow rate through the dehydrator and the flow rate from the fluid pump at relatively low temperatures of the hydraulic fluid, the dehydration system includes a fluid feedback line that returns a portion of the hydraulic fluid flow from the outlet of the fluid heater to the inlet of the fluid pump. Specifically, the system monitors the pressure of the hydraulic fluid entering into the dehydrator and opens a relief valve to allow a return flow of hydraulic fluid when the pressure at the inlet to the dehydrator exceed a threshold value. Thus, at relatively low temperatures for the hydraulic fluid, a significant portion of the hydraulic fluid flow leaving the fluid heater is returned to the inlet of the fluid pump. In this manner, the hydraulic fluid is recirculated through the fluid heater, thereby further elevating the temperature of the hydraulic fluid before the fluid reaches the dehydrator. As discussed previously, as the temperature of the hydraulic fluid increases, the possible flow rate of hydraulic fluid through the dehydrator also increases. As the flow rate through the dehydrator increases, the pressure at the inlet to the dehydrator decreases, thus reducing the amount of feedback flow through the fluid heater.

Once the hydraulic fluid has passed through the dehydrator, the hydraulic fluid is returned to the storage tank by a return hose. It is contemplated that the dehydration system of the present disclosure can remove a significant amount of water from a supply of hydraulic fluid by simply connecting the mobile dehydration system to the supply of hydraulic fluid and allowing the dehydration system to operate for an extended period of time, such as a couple of hours, or for a fluid with a high water content, overnight.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
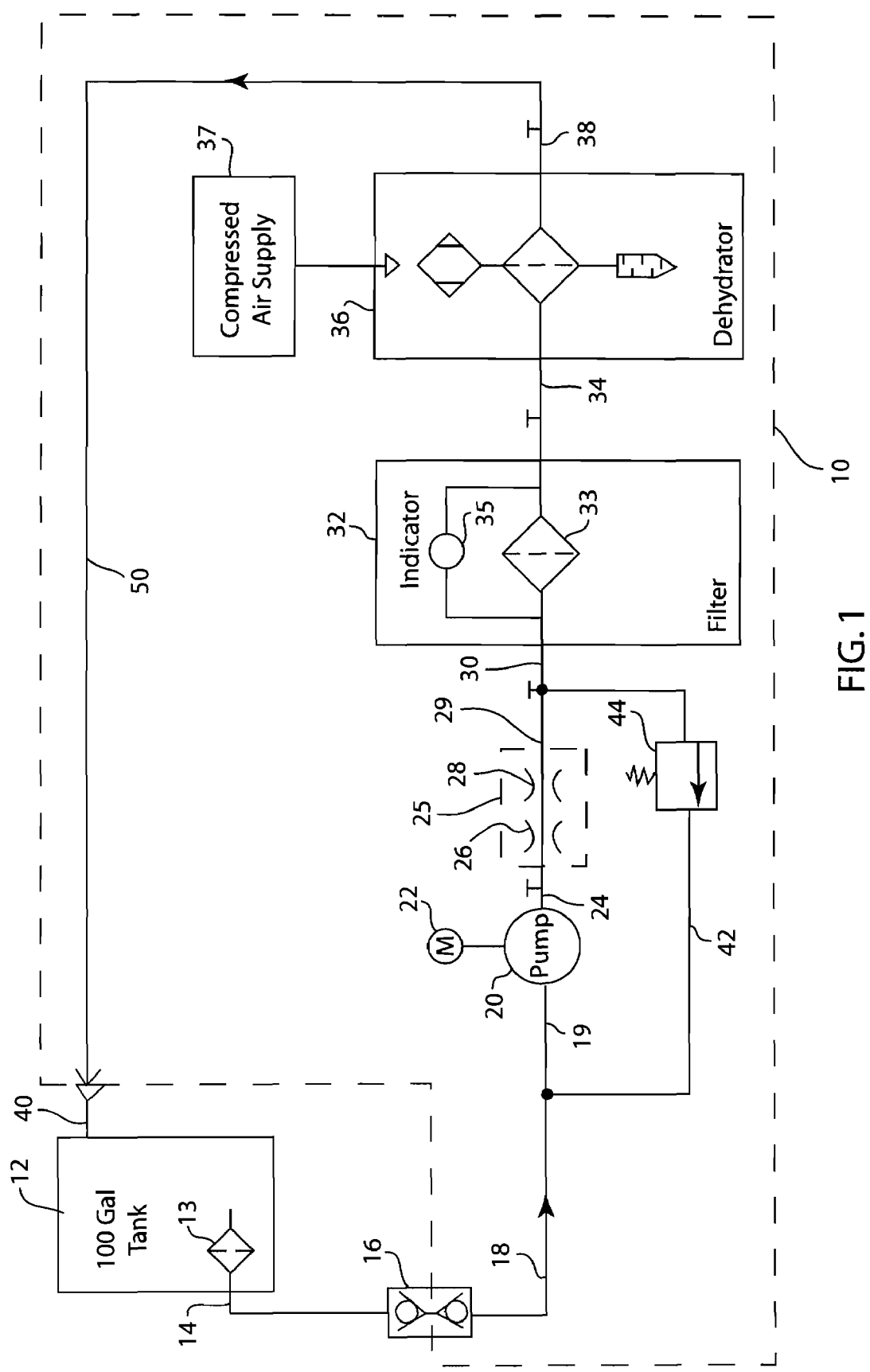
FIG. 1 is a schematic illustration of a system and method for removing water from a hydraulic fluid.

FIG. 1 is a schematic illustration of a system 10 that is operable to remove water from a supply of hydraulic fluid, such as oil. Throughout the following description, the term "hydraulic fluid" should be interpreted to include various fluids, such as oil. As shown in FIG. 1, the supply of hydraulic fluid is contained within a storage tank 12. In the embodiment illustrated, the storage tank 12 is a 100 gallon tank, although other size tanks are contemplated as being within the scope of the present invention. The storage tank 12 may be located on a large vehicle, such as a concrete pumping vehicle, that operates various components using pressurized hydraulic fluid. Alternatively, the storage tank 12 could be located at any location that hydraulic fluid or a similar fluid is required.

The storage tank 12 includes an internal filter 13 connected to an outlet 14 that is in fluid communication with the dehydration system 10 through a connector 16. The connector 16 is a standard fluid connector formed as part of a suction line or inlet hose 18 that allows the dehydration system 10 to be in fluid communication with the storage tank 12.

The hose 18 is connected to an inlet 19 of a fluid pump 20 that is operable to create negative pressure within the inlet hose 18 to draw the supply of hydraulic fluid from the storage tank 12. In the embodiment of the invention illustrated, the fluid pump 20 is driven by an electric drive motor 22, although other types of power sources or motors are contemplated. The electric motor 22 includes a cord that allows the electric motor 22 to be connected to an available supply of electric power. In the embodiment of the invention illustrated in FIG. 1, the pump 20 is a five gallons per minute (gpm) pump, although other sizes for the pump 20 are contemplated as being within the scope of the present disclosure.

Outlet 24 of the fluid pump 20 is connected to a fluid heater 25 that is operable to elevate the temperature of the hydraulic fluid received from the fluid pump. In the embodiment shown, the fluid heater 25 includes a pair of first and second flow restricting orifices 26, 28. In the embodiment illustrated, the outlet 24 has an internal diameter of approximately ¾ inch, while each of the orifices 26, 28 have a smaller inner diameter. As an example, in the embodiment illustrated in FIG. 1, the first flow orifice 26 may have an internal diameter of approximately ¼ inch. Thus, fluid flow within the outlet 24, which has an internal diameter of approximately ¾ inch, is restricted down to flow through the ¼ inch diameter first orifice 26. In the embodiment shown in FIG. 1, a second orifice 28 is positioned immediately adjacent to the first orifice 26. The second orifice 28 has a further reduced diameter of approximately ⅛ inch. Although specific sizes of the first and second orifices 26, 28 are described, it should be understood that different diameters can be utilized while operating within the scope of the present disclosure.

Since the diameter of both of the first and second flow restricting orifices 26, 28 are less than the diameter of the outlet 24 of the fluid pump 20, the velocity of the hydraulic fluid flow through the flow restricting orifices 26, 28 increases while the pressure of the hydraulic fluid across each of the first and second orifices 26, 28 drops. The decrease in pressure and increase in flow rate of the hydraulic fluid through the first and second flow restricting orifices 26, 28 causes the temperature of the hydraulic fluid to increase. Thus, the temperature of the hydraulic fluid at the outlet 29 of the fluid heater 25 is greater than the temperature of the hydraulic fluid at the outlet 24 of the fluid pump 20.

After the flow of hydraulic fluid has passed through both the first and second orifices 26, 28, the hydraulic fluid leaves the heater 25 through the outlet 29. The outlet 29 may have the same diameter as the inlet 24 or could have a slightly reduced diameter depending upon the connection to the remaining downstream components of the dehydration system 10.

Although the fluid heater 25 in the embodiment shown in FIG. 1 includes the pair of first and second orifices 26, 28, it is contemplated that the heater 25 could include only a single orifice or greater than two orifices. In an embodiment in which only a single orifice is used, the orifice would have an internal diameter of approximately ⅛ inch, which would result in heating of the fluid as the fluid passes through the orifice.

Although the fluid heater 25 is shown and described in FIG. 1 as including either one or a pair of orifices, it is contemplated that the heater 25 could operate in a different manner, such as an electric heater positioned to receive the supply of hydraulic fluid from the pump 20. However, the use of either a single or pair of orifices 26, 28 eliminates the need for additional power to operate the heater 25.

Due to the fluid properties of the hydraulic fluid, the pressure of the hydraulic fluid within the outlet 24 upstream of the first and second orifices 26, 28 is greater than the pressure at the heater outlet 29. Since the pressure of the fluid drops across the restricted diameters of orifices 26, 28, the pressure drop creates heat, such that the temperature of the hydraulic fluid at the heater outlet is greater than the temperature of the hydraulic fluid at the pump outlet 24. In the embodiment shown in FIG. 1, as much as a 40° F. rise in oil temperature can take place as the hydraulic fluid circulates through the pair of first and second orifices 26, 28.

The heater outlet 29 is connected to a filter inlet 30 to feed the hydraulic fluid into a filter 32 that removes particulate from the hydraulic fluid. The filter 32 is a conventional component that includes a filter element 33 that removes particles larger than a predetermined size. The filter 32 further includes an indicator 35 that displays the amount of debris accumulated by the filter 32 by monitoring the pressure drop across the filter. When the filter element 33 is clean, very little pressure drop occurs across the filter. As the filter becomes contaminated with debris, the pressure drop across the filter increases, indicating the filter needs to be cleaned.

After the hydraulic fluid flows through the filter 32, the hydraulic fluid is received within a dehydrator inlet 34. Because the filter introduces very little resistance into the flow path of the hydraulic fluid when clean, very little pressure drop exists across the filter 32.

The hydraulic fluid received at the dehydrator inlet 34 enters into the dehydrator 36. As discussed previously, the dehydrator includes a series of porous tubes that receive the hydraulic fluid and allow the hydraulic fluid to pass from the dehydrator inlet 34 to the dehydrator outlet 38. In the embodiment of the invention illustrated in FIG. 1, the dehydrator 36 is a porous media dehydrator, such as the UltiDri model available from Porous Media. The porous media dehydrator 34 includes the series of individual tubes formed from a membrane that allows the passage of water and restricts the passage of hydraulic fluid. The dehydrator 34 is connected to a supply of compressed air 37 that flows over the series of internal tubes. As the hydraulic fluid flows through the porous media dehydrator 36, the compressed air flows over the outer surface of the porous material and water is removed from the hydraulic fluid and vented to atmosphere.

After the hydraulic fluid has passed through the dehydrator 36 and enters the dehydration outlet 38, the hydraulic fluid is returned to the storage tank 12 by a return hose 50 connected to the tank inlet 40.

Since the hydraulic fluid at the dehydration inlet 34 is met with substantial resistance when the hydraulic fluid is at a relatively low temperature, the flow rate of fluid from the fluid pump 20 is greater than the flow rate of fluid through the dehydrator 36. To accommodate the different flow rates, the system 10 includes a fluid feedback line 42 extending between the heater outlet 29 and the fluid pump inlet 19. The feedback line 42 includes a relief valve 44. The relief valve 44 is biased to open only when the pressure of the fluid at the junction between the heater outlet 29 and the filter inlet 30 exceeds a predetermined threshold. In the embodiment of the invention illustrated, the threshold for the relief valve 44 is set at 45 psi. However, other pressures can be utilized while operating within the scope of the present invention.

The operation of the dehydration system 10 will now be described. In the example to be described, it is assumed that the ambient temperature of the hydraulic fluid within the storage tank 10 is 35° F. The hydraulic fluid is drawn from the storage tank 12 and passes through the pump 20 and the pair of orifices 26, 28 within the fluid heater 25 and is received by the filter 32. Since the filter 32 provides very little resistance to the hydraulic fluid flow, the hydraulic fluid is then received at the dehydrator inlet 34. When the temperature of the hydraulic fluid is low, such as 35° F., the maximum flow rate through the porous media dehydrator 36 is approximately 0.15 gallons per minute (gpm). The physical characteristics of the porous media dehydrator 36 determine the maximum flow rate through the dehydrator 36. Listed below is a chart illustrating the maximum flow rate at various temperatures for the porous media dehydrator 36 of the embodiment shown:

TABLE A

| Temperature | Maximum Flow Rate |
| --- | --- |
| 160° F. | 4.0 gpm |
| 110° F. | 1.7 gpm |
| 70° F. | 0.6 gpm |
| 35° F. | 0.15 gpm |

Although specific flow rate values are listed above, it should be understood that the porous media dehydrator 36 could be a different type of dehydrator such that the flow rates at the temperatures listed may vary. However, it is important to note that regardless of the type of porous media dehydrator, the flow rate is significantly lower at low temperatures due to the viscosity of the hydraulic fluid.

As discussed above, when the temperature of the hydraulic fluid is only 35° F., the maximum flow rate through the dehydrator 36 is 0.15 gpm. However, the pump 20 in the embodiment illustrated is a 5.0 gpm pump such that pressure begins to build at the filter inlet 30 and the dehydration inlet 34. As the pressure begins to build, the hydraulic fluid pressure will exceed the threshold pressure of the relief valve 44, thus causing a significant portion of the hydraulic fluid to return to the inlet 19 of the pump 20 through the fluid feedback line 42. As described, since only 0.15 gpm of hydraulic fluid is flowing through the dehydrator 36, 4.85 gpm will be flowing through the fluid feedback line 42.

As the hydraulic fluid returns to the pump inlet 46, the hydraulic fluid mixes with the fluid drawn from the tank 12 and is again pumped through the pair of first and second orifices 26, 28 of the heater 25. As described previously, the flow of the hydraulic fluid through the pair of orifices 26, 28 elevates the temperature of the hydraulic fluid. As can be understood by Table 1 above, as the temperature of the hydraulic fluid increases, the flow rate through the dehydrator 36 also increases. As an example, if the temperature of the fluid entering the pump 10 is 110° F. and the temperature is raised 40° to 150° F., the flow rate of water removal by the dehydrator 36 stated in PPM/hour is dramatically increased, as indicated in the Table B set forth below:

TABLE B

| Temperature | PPM/Hour |
| --- | --- |
| 160° F. | 166.7 |
| 150° F. | 150 |
| 110° F. | 80.0 |
| 70° F. | 32.3 |

As the above table indicates, if the temperature of the hydraulic fluid increases by 40°, the water removal rate at lower temperatures (70° F. to 110° F.) more than doubles and at higher temperatures (110° F. to 150° F.) nearly doubles. Thus, the use of the pair of orifices 26, 28 to increase the temperature of the hydraulic fluid by 40° over ambient significantly increases the water removal rate by the porous media dehydrator 36.

Figure 2:
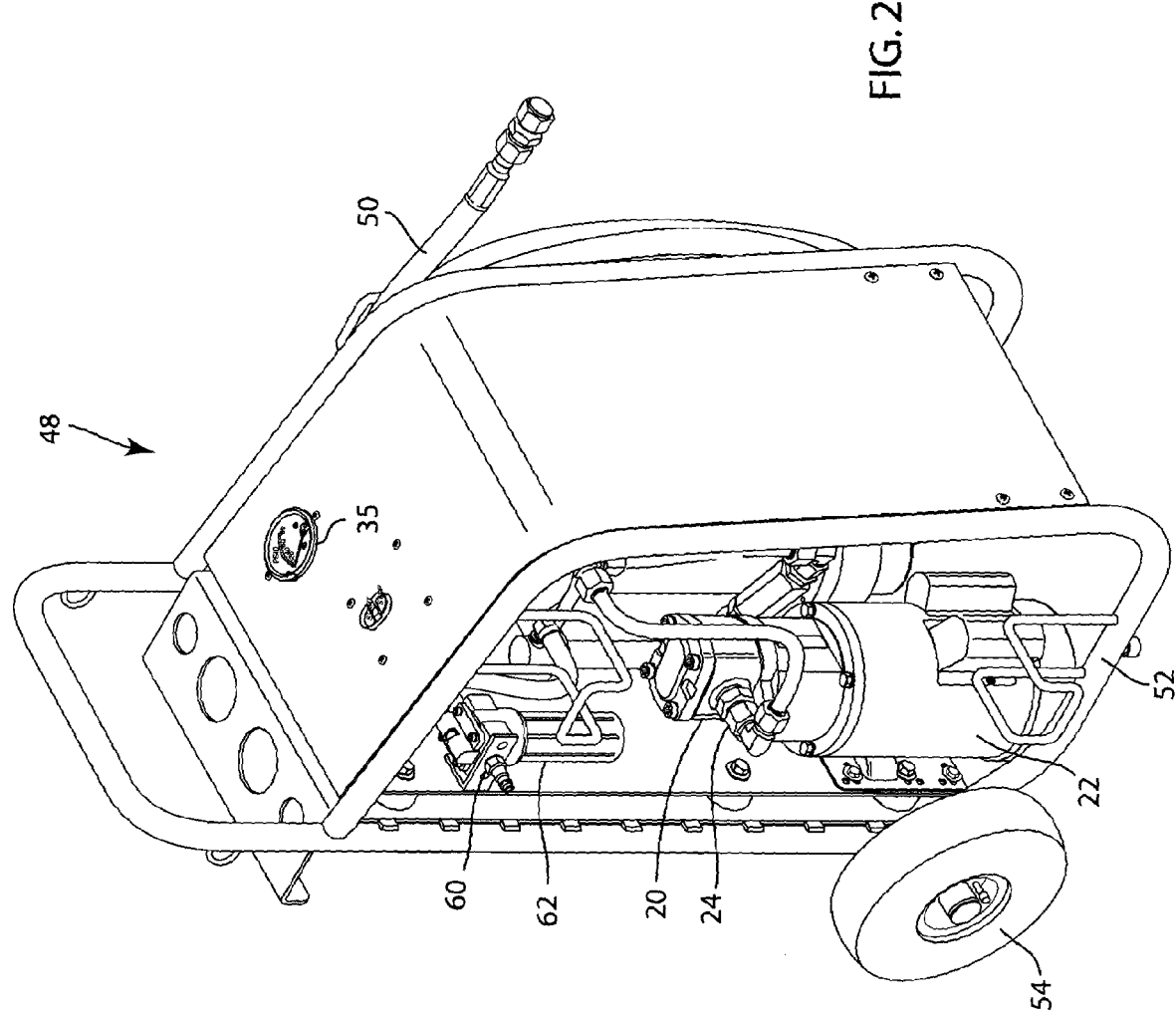
FIG. 2 is a left side, front elevational view of a portable dehydration system operable to remove water from hydraulic fluid.
Figure 3:
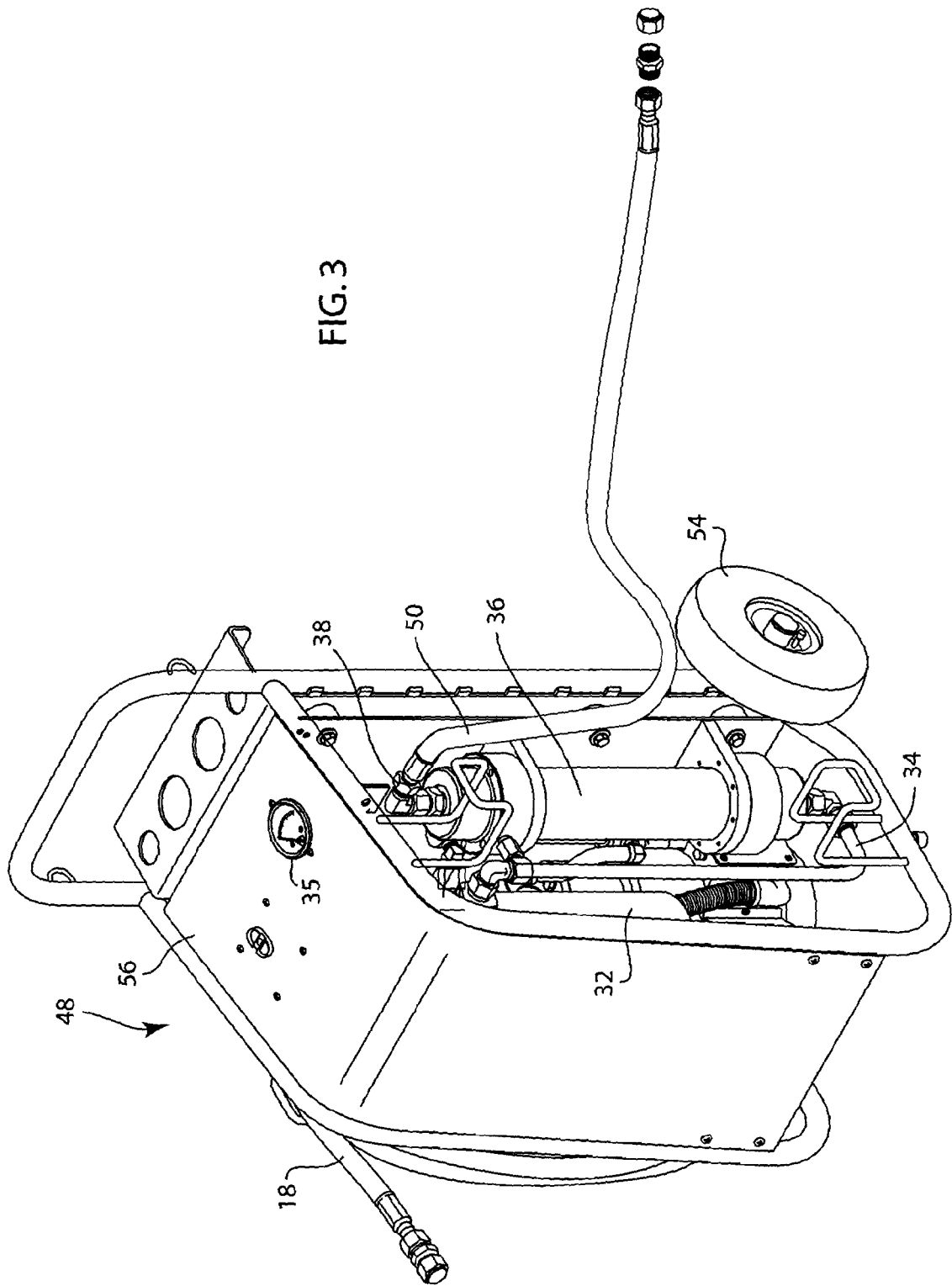
FIG. 3 is a right side, front elevational view of the dehydration system shown in FIG. 2.

Referring now to FIGS. 2-3, thereshown is a specific implementation of the dehydration system 10 shown in FIG. 1. In the embodiments shown in FIGS. 2-3, the dehydration system 10 is included as a dehydrator and filter cart 48. The filter cart 48 includes the inlet hose 18 that connects to the hydraulic fluid storage tank and the return hose 50 that returns the filtered and dehydrated hydraulic fluid back to the storage tank.

As illustrated in FIG. 2, the cart 48 includes a frame 52 supported by a pair of wheels 54 such that the cart 48 can be moved to a desired location. The cart 48 includes the electrically operated fluid pump 20 and motor 22. As shown in FIG. 3, the cart 48 also includes both the filter 32 and dehydrator 36. The dehydrator 36 includes the outlet 38 connected to the return hose 50 to return the supply of dehydrated fluid to the supply tank. A top panel 56 includes various gauges and operating switches such that the electric pump can be operated by a user.

Referring back to FIG. 2, the cart 48 includes a compressed air inlet 60 that is connected to a supply of compressed air. The compressed air inlet 60 directs the compressed air through an air filter 62 to remove moisture and dirt from the incoming compressed air line. As previously discussed with reference to FIG. 1, the compressed air passes through the dehydrator 36 to remove water from the hydraulic fluid as the hydraulic fluid passes through the dehydrator 36.

Although one embodiment of the system is shown in FIGS. 2-3, it should be understood that the system could be incorporated directly onto a vehicle, such as a mobile concrete pumping unit, while operating within the scope of the invention. The portable unit shown in FIGS. 2-3 allows the dehydration system to be utilized with different large, hydraulically powered vehicles.

As described above, the dehydration system 10, and specifically the filter cart 48, is designed to effectively remove water and eliminate the negative effects of water and contamination in hydraulic systems. Water in mineral oil promotes oil degradation by accelerated oil aging, increases foaming (and resultant cavitation), reduces lubrication, oxidation/rust and deterioration of the oil additive, which results in costly component wear, maintenance and failure. Water is present in the hydraulic fluid as a result of ambient humidity, splash water, water ingested past hydraulic seals, or water present in new oil.

The cart 48 shown in FIGS. 2-3 can be easily connected to the reservoir of a vehicle by a single inlet hose and a single return line. When the dehydration system 10 shown in the Figures is utilized with a 100 gallon reservoir, the system will lower the water concentration from 2,400 PPM to 400 PPM in typically a 10-12 hour period while at the same time removing contamination from the oil.

We claim:

1. A mobile dehydration system operable to dehydrate a supply of hydraulic fluid, the mobile dehydration system comprising:
    an inlet hose configured to receive the supply of hydraulic fluid;
    a fluid pump having an inlet coupled to the inlet hose and an outlet, the fluid pump being operable to draw the supply of hydraulic fluid through the inlet hose;
    a fluid heater having an inlet positioned to receive the supply of hydraulic fluid from the fluid pump and operable to heat the hydraulic fluid as the fluid passes through the heater from the fluid heater inlet to a fluid heater outlet;
    a fluid feedback line connected directly between the outlet of the fluid heater and the inlet of the fluid pump to return a first portion of the hydraulic fluid flow from the fluid heater to the fluid pump inlet for additional heating by the fluid heater;
    a dehydrator positioned to receive a second portion of the heated hydraulic fluid flow from the fluid heater outlet and operable to remove water from the hydraulic fluid; and
    a return hose coupled to the outlet of the fluid dehydrator to return the dehydrated hydraulic fluid to the supply.

2. The system of claim 1 wherein the fluid heater includes a plurality of flow restricting orifices each operable to reduce the pressure of the hydraulic fluid and thereby heat the hydraulic fluid as the hydraulic fluid flows through the plurality of orifices.

3. The system of claim 2 wherein each of the flow restricting orifices has an internal diameter less than the internal diameter of the outlet of the fluid pump.

4. The system of claim 1 wherein the fluid feedback line includes a relief valve operable to permit the flow of hydraulic fluid through the feedback line only when the fluid pressure at the outlet of the heater exceeds a pressure threshold.

5. The system of claim 1 further comprising a filter positioned between the heater outlet and the inlet to the fluid dehydrator.

6. The system of claim 1 wherein the mobile dehydration system includes a support cart, wherein the fluid pump, the fluid heater and the fluid dehydrator are all mounted to the support cart such that the mobile dehydration system is self-contained.

7. The system of claim 6 wherein the mobile dehydration system is separately movable from the supply of hydraulic fluid.

8. The system of claim 1 wherein the fluid heater includes at least one flow restricting orifice that receives the flow of hydraulic fluid from the fluid pump and reduces the pressure of the hydraulic fluid to thereby heat the hydraulic fluid as the hydraulic fluid flows through the orifice.

9. The system of claim 8 wherein the at least one flow restricting orifice has an internal diameter smaller than the internal diameter of the outlet of the fluid pump.

10. A method of dehydrating a supply of hydraulic fluid, the method comprising the steps of:
    operating a fluid pump to draw the supply of hydraulic fluid through an inlet hose at a flow rate;
    flowing the hydraulic fluid through a fluid heater such that the supply of hydraulic fluid received from the fluid pump is heated as the hydraulic fluid passes through the fluid heater;
    supplying a first portion of the heated hydraulic fluid flow to a fluid dehydrator; and
    returning a second portion of the heated hydraulic fluid flow to the fluid pump through a feedback line connected to directly between a fluid heater outlet and an inlet of the fluid pump such that the second portion is recirculated through the fluid heater for further heating, wherein the second portion of the fluid flow is determined by the flow rate of the hydraulic fluid through the fluid dehydrator.

11. The method of claim 10 wherein the step of heating the hydraulic fluid comprises flowing the hydraulic fluid through the fluid heater including a plurality of flow restricting orifices, wherein the internal diameter of each of the plurality of flow restricting orifices is smaller than an internal diameter of an outlet of the fluid pump such that the hydraulic fluid is heated as the hydraulic fluid passes through the plurality of flow restricting orifices.

12. The method of claim 10 wherein the fluid feedback line includes a relief valve selectively operable between an open position and a closed position, wherein the relief valve moves to the open position to permit the second portion of the fluid flow to return to the inlet of the fluid pump when the pressure of the hydraulic fluid exceeds a threshold pressure.

13. The method of claim 10 further comprising the steps of:
monitoring the pressure of the fluid flow to the fluid dehydrator; and
opening a relief valve to allow the fluid flow to return to the inlet of the fluid heater when the pressure exceeds a pressure threshold.

14. The method of claim 10 wherein the step of heating the hydraulic fluid comprises flowing the hydraulic fluid through at least a first flow restricting orifice, wherein the first flow restricting orifice has an internal diameter less than the internal diameter of an outlet of the fluid pump such that the hydraulic fluid is heated as the hydraulic fluid passes through the first flow restricting orifice.

15. A self-contained, mobile dehydration system operable to dehydrate a supply of hydraulic fluid, the mobile dehydration system comprising: a mobile support cart; a fluid pump mounted to the support cart;
an inlet hose configured to receive the supply of hydraulic fluid, the inlet hose coupled to an inlet of the fluid pump such that the fluid pump is operable to draw the supply of hydraulic fluid through the inlet hose;
a fluid heater mounted to the support cart and having an inlet positioned to receive the supply of hydraulic fluid from the fluid pump, the fluid heater including at least a first flow restricting orifice such that as the hydraulic fluid passes through the flow restricting orifice, the hydraulic fluid is heated;
a fluid feedback line connected directly between an outlet of the fluid heater and the inlet of the fluid pump to return a first portion of the hydraulic fluid flow from the fluid heater to the fluid pump inlet for additional heating by the fluid heater;
a dehydrator mounted to the support cart and positioned to receive a second portion of the heated hydraulic fluid flow from the fluid heater outlet, the dehydrator being operable to remove water from the hydraulic fluid; and
a return hose coupled to an outlet of the fluid dehydrator to return the dehydrated hydraulic fluid to the supply.

16. The system of claim 15 wherein the fluid feedback line includes a relief valve operable to permit the flow of hydraulic fluid through the feedback line only when the fluid pressure at the outlet of the fluid heater exceeds a pressure threshold.

17. The system of claim 16 wherein the fluid pressure at the outlet of the heater is dependent upon the flow rate of hydraulic fluid through the dehydrator.

18. The system of claim 15 wherein the fluid heater includes a plurality of flow restricting orifices each operable to reduce the pressure of the hydraulic fluid and thereby heat the hydraulic fluid as the hydraulic fluid flows through the plurality of flow restricting orifices.

19. The system of claim 15 wherein the flow restricting orifice has an internal diameter less than the internal diameter of the outlet of the fluid pump.

\* \* \* \* \*